United States Patent
Hioki (10) Patent No.: US 10,753,538 B2
(45) Date of Patent: Aug. 25, 2020

(54) GAS TANK LINER AND GAS TANK

(71) Applicant: TOYOTA JIDOSHA KABUSHIKI KAISHA, Toyota-shi, Aichi-ken (JP)

(72) Inventor: Kentaroh Hioki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 401 days.

(21) Appl. No.: 15/869,497

(22) Filed: Jan. 12, 2018

(65) Prior Publication Data

US 2018/0202606 A1     Jul. 19, 2018

(30) Foreign Application Priority Data

Jan. 18, 2017   (JP) .................... 2017-006290

(51) Int. Cl.
   *F17C 1/16*  (2006.01)
   *F17C 1/00*  (2006.01)
   (Continued)

(52) U.S. Cl.
   CPC .............. *F17C 1/06* (2013.01); *B29C 61/04* (2013.01); *B29C 63/26* (2013.01); *B29C 70/16* (2013.01);
   (Continued)

(58) Field of Classification Search
   CPC ....... B29C 53/605; B29C 61/04; B29C 63/26; B29C 63/10; B29C 70/16; F17C 1/06; F17C 1/005; F17C 2201/0109; F17C 2201/056; F17C 2203/0604; F17C 2203/0619; F17C 2203/066; F17C 2203/0663; F17C 2203/0685; F17C 2223/0123; F17C 2223/036; F17C 2260/01;
   (Continued)

(56) References Cited

U.S. PATENT DOCUMENTS 3,037,656 A * 6/1962 Humphrey ............ F17C 13/025
                                                  220/565
3,210,228 A * 10/1965 Bluck .................... B29C 53/602
                                                  156/172
(Continued)

FOREIGN PATENT DOCUMENTS

| CN | 102190098 A | 9/2011 |
| DE | 10 2011 012 704 A1 | 1/2012 |
| JP | 2015-108399 | 6/2015 |

OTHER PUBLICATIONS

Matweb Material Property Datasheets for EVOH, PET, Nylon 6 in varying glass fiber reinforced http://www.matweb.com/search/DataSheet.aspx (Year: 2020).*

*Primary Examiner* — Gideon R Weinerth
(74) *Attorney, Agent, or Firm* — Finnegan, Henderson, Farabow, Garrett & Dunner, LLP (57) ABSTRACT

A gas tank liner comprises: a cylindrical section formed using a first resin; and a dome section formed using a second resin, the dome section being arranged at each axially opposite end of the cylindrical section, wherein either one of the first resin or the second resin has a higher linear expansion coefficient and higher yield strain than the other, the yield strain being the threshold of strain that, when met, makes the first resin or the second resin incapable of restoring its original state if the first resin or the second resin strains and yields in response to the application of external force.

16 Claims, 5 Drawing Sheets

(51) Int. Cl.
*F17C 1/06* (2006.01)
*B29C 61/04* (2006.01)
*B29C 63/26* (2006.01)
*B29C 70/16* (2006.01)
*B29C 53/60* (2006.01)
*B29C 63/10* (2006.01)

(52) U.S. Cl.
CPC ............ *F17C 1/005* (2013.01); *B29C 53/605* (2013.01); *B29C 63/10* (2013.01); *F17C 2201/0109* (2013.01); *F17C 2201/056* (2013.01); *F17C 2203/0604* (2013.01); *F17C 2203/066* (2013.01); *F17C 2203/0619* (2013.01); *F17C 2203/0663* (2013.01); *F17C 2203/0685* (2013.01); *F17C 2221/012* (2013.01); *F17C 2223/0123* (2013.01); *F17C 2223/036* (2013.01); *F17C 2260/01* (2013.01); *F17C 2270/0168* (2013.01); *F17C 2270/0184* (2013.01)

(58) Field of Classification Search
CPC ...... F17C 2270/0168; F17C 2270/0184; F17C 1/16; Y10S 248/901
USPC .............. 220/586, 901, 581, 560.04, 560.05, 220/560.06; 165/46; 429/515, 535
See application file for complete search history.

(56) References Cited

U.S. PATENT DOCUMENTS

| | | | | |
|---|---|---|---|---|
| 3,446,385 A * | 5/1969 | Ponemon | ................. | F17C 1/16 220/590 |
| 4,964,524 A * | 10/1990 | Halene | ................. | C01B 3/0005 220/586 |
| 5,659,941 A * | 8/1997 | Huvey | ................. | B21D 51/24 29/421.1 |
| 6,145,692 A * | 11/2000 | Cherevatsky | ............. | F17C 1/04 220/581 |
| 6,547,092 B1 * | 4/2003 | Chervatsky | ............... | F17C 1/00 220/581 |
| 6,808,833 B2 * | 10/2004 | Johnson | ............ | H01M 8/04082 429/443 |
| 7,971,740 B2 * | 7/2011 | Shimada | ................. | F17C 1/00 220/23.83 |
| 8,435,700 B2 * | 5/2013 | Okawachi | ................. | F17C 1/06 220/586 |
| 8,453,868 B2 * | 6/2013 | Cola | ....................... | F17C 1/06 220/586 |
| 8,540,110 B2 * | 9/2013 | Lukiyanets | ............... | F17C 1/00 206/591 |
| 2003/0111473 A1 | 6/2003 | Carter et al. | | |
| 2004/0108098 A1 * | 6/2004 | Sanders | ................. | B29C 65/56 165/46 |
| 2008/0201932 A1 * | 8/2008 | Schlag | .................... | F16J 12/00 29/452 |
| 2009/0152278 A1 * | 6/2009 | Lindner | ................... | F17C 1/00 220/589 |
| 2009/0263315 A1 * | 10/2009 | Mehta | ...................... | F17C 1/16 423/648.1 |
| 2010/0001005 A1 * | 1/2010 | Chong | ................. | F17C 13/001 220/560.05 |
| 2010/0126999 A1 * | 5/2010 | Kleber | ...................... | F17C 1/14 220/582 |
| 2011/0210475 A1 * | 9/2011 | Strack | ..................... | B29C 45/16 264/254 |
| 2011/0220660 A1 | 9/2011 | Strack | | |
| 2015/0240993 A1 | 8/2015 | DeLay | | |
| 2015/0316207 A1 * | 11/2015 | Laney | ...................... | B05D 1/02 220/581 |
| 2016/0333895 A1 * | 11/2016 | Baltes | ..................... | F15B 1/106 |
| 2017/0246794 A1 * | 8/2017 | Cola | ................. | B29C 66/02245 |
| 2018/0162081 A1 * | 6/2018 | Kloft | ........................ | F17C 1/16 |
| 2018/0202554 A1 * | 7/2018 | Hogan | ..................... | F16J 12/00 |
| 2018/0202606 A1 * | 7/2018 | Hioki | ...................... | B29C 70/16 |
| 2019/0309905 A1 * | 10/2019 | Ishikawa | ............... | F17C 13/006 |

\* cited by examiner

GAS TANK LINER AND GAS TANK

CROSS-REFERENCE TO RELATED APPLICATIONS

The present application claims priority from Japanese patent application 2017-6290 filed on Jan. 18, 2017, the content of which is hereby incorporated by reference into this application.

BACKGROUND

Field

The present disclosure relates to a gas tank liner and a gas tank.

Related Art

A fuel tank to be installed on a fuel cell vehicle is described in JP2015-108399A. This fuel tank is a gas tank with a liner made of a resin having a cylindrical section at the center and dome sections provided at opposite ends of the cylindrical section. A fiber-reinforced resin layer is provided externally to the liner.

If a fuel cell vehicle is driven continuously, particularly if the fuel cell vehicle is driven continuously on an expressway, for example, fuel gas is supplied continuously to a fuel cell from the fuel tank. Pressure inside the fuel tank is high. Thus, when the fuel gas is released from the fuel tank, the fuel gas expands adiabatically. As a result, the liner of the fuel tank is reduced in temperature and shrinks. Meanwhile, the fiber-reinforced resin layer external to the liner has a lower thermal expansion coefficient than the liner. Hence, the fiber-reinforced resin layer does not shrink largely with the temperature reduction. As a result, a gap is formed between the liner, particularly, between the dome section of the liner and the fiber-reinforced resin layer. If gas is injected into the fuel tank in this state, the pressure of the gas pushes the liner to expand. If the temperature of the liner is low, however, the resin forming the liner is cured and is difficult to expand accordingly. This causes a risk of plastic deformation or damage to the liner during the filling of gas.

SUMMARY

According to one aspect of the present disclosure, a gas tank liner is provided. The liner includes: a cylindrical section formed using a first resin; and a dome section formed using a second resin. The dome section is arranged at each axially opposite end of the cylindrical section. One of either the first resin or the second resin has a higher linear expansion coefficient and higher yield strain than the other. The yield strain is the threshold of strain that, when met, makes the first resin or the second resin incapable of restoring its original state if the first resin or the second resin strains and yields in response to the application of external force.

According to this aspect, one of either the first resin or the second resin has a higher linear expansion coefficient and higher yield strain than the other. Thus, during filling with gas, a section of the liner formed using the resin having a high linear expansion coefficient and high yield strain expands easily. This makes it possible to suppress plastic deformation or damage to the liner further than the case where the liner is entirely formed using the same resin.

According to one aspect of the present disclosure, a gas tank is provided. The gas tank comprises: the liner in accordance with any one of above aspects; and a fiber-reinforced resin layer formed on an outer periphery of the liner.

According to this aspect, one of either the first resin or the second resin has a high linear expansion coefficient and high yield strain. This causes a section of the liner formed using the resin having a high linear expansion coefficient and high yield strain to expand during filling with gas. This makes it possible to suppress plastic deformation or damage to the liner further than the case where the liner is entirely formed using the same resin.

The gas tank according to the above aspect, the following formula is satisfied:

[Formula 1]

$$L_s \leq 2L_d \frac{\left(\frac{L_d}{\Delta T} - \alpha_d + \alpha_c\right)}{\left(\alpha_s - \alpha_c - \frac{L_s}{\Delta T}\right)} \quad (1)$$

where $\Delta T$ is a temperature difference between a high temperature $T1$ at a time after completion of filling with gas and a low temperature $T2$ at a time before commencement of filling with the gas, $L_s$ is an axial length of the cylindrical section and $L_d$ is an axial length of the dome section, each being at the high temperature $T1$, $\alpha_s$ is an average linear expansion coefficient of the first resin, $\alpha_d$ is an average linear expansion coefficient of the second resin, and $\alpha_c$ is an average linear expansion coefficient of the fiber-reinforced resin layer, each being in a period from the high temperature $T1$ to the low temperature $T2$, and $\varepsilon_s$ is yield strain of the first resin and $\varepsilon_d$ is yield strain of the second resin, each being at the low temperature $T2$.

According to this aspect, if the dome section of the liner and a fiber-reinforced resin layer tightly contact each other at the high temperature $T1$ and then the temperature of the gas tank is reduced to the low temperature $T2$, the gap between the dome section and the fiber-reinforced resin layer does not exceed the yield strain of the liner. This makes it possible to suppress plastic deformation or damage to the liner more reliably.

According to one aspect of the present disclosure, a gas tank is provided. The gas tank comprises:
a liner; and
a fiber-reinforced resin layer formed on an outer periphery of the liner, wherein
the liner comprises:
a cylindrical section formed using a first resin; and
a dome section formed using a second resin, the dome section being arranged at each axially opposite end of the cylindrical section, and
the following formula is satisfied:

[Formula 2]

$$L_s \leq 2L_d \frac{\left(\frac{L_d}{\Delta T} - \alpha_d + \alpha_c\right)}{\left(\alpha_s - \alpha_c - \frac{L_s}{\Delta T}\right)} \quad (2)$$

where ΔT is a temperature difference between a high temperature T1 at a time after completion of filling with gas and a low temperature T2 at a time before commencement of filling with the gas, Ls is an axial length of the cylindrical section and Ld is an axial length of the dome section, each being at the high temperature T1, $α_s$ is an average linear expansion coefficient of the first resin, $α_d$ is an average linear expansion coefficient of the second resin, and $α_c$ is an average linear expansion coefficient of the fiber-reinforced resin layer, each being in a period from the high temperature T1 to the low temperature T2, and $ε_s$ is yield strain of the first resin and $ε_d$ is yield strain of the second resin, each being at the low temperature T2, the yield strain being the threshold of strain that, when met, makes the first resin or the second resin incapable of restoring its original state if the first resin or the second resin strains and yields in response to the application of external force.

According to this aspect, if the dome section of the liner and a fiber-reinforced resin layer tightly contact each other at the high temperature T1 and then the temperature of the gas tank is reduced to the low temperature T2, the gap between the dome section and the fiber-reinforced resin layer does not exceed the yield strain of the liner. This makes it possible to suppress plastic deformation or damage to the liner more reliably.

DESCRIPTION OF EMBODIMENTS

First Embodiment

Figure 1:
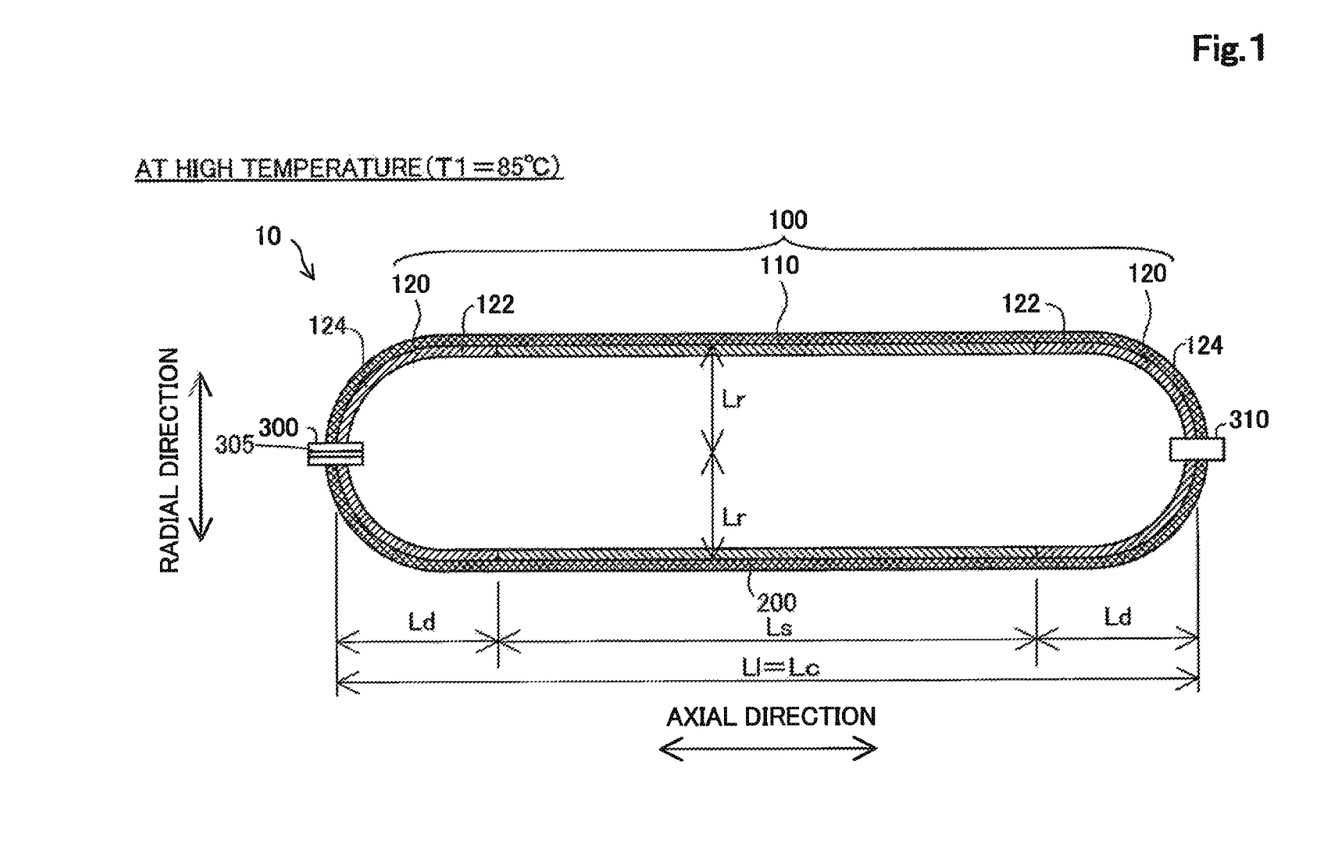
FIG. 1 is a sectional view showing a gas tank in a state of being manufactured at a high temperature T1.

FIG. 1 is a sectional view showing a gas tank 10 in a state of being manufactured at a high temperature T1 (T1=plus 85° C.). If compressed, gas is increased in temperature. If gas starts to be injected into the gas tank 10 empty of gas to fully fill the gas tank 10 with the injected gas, the gas tank 10 after the filling is placed at a temperature of about plus 85° C. The gas tank 10 includes a liner 100 and a fiber-reinforced resin layer 200. The liner 100 includes a cylindrical section 110, and two dome sections 120 arranged at axially opposite ends of the cylindrical section 110. Each of the two dome sections 120 includes a cylindrical part 122 and a substantially spherical part 124. The substantially spherical part 124 is a part excluding the cylindrical part 122. The substantially spherical part 124 has a central portion to which a mouth member 300 or a mouth member 310 is attached. The mouth member 300 has a hole 305 for connecting the inside and the outside of the liner 100. The mouth member 310 does not have the hole 305. Alternatively, the mouth member 310 may have a hole. In this case, the hole in the mouth member 310 may be closed by a blocking member.

The cylindrical section 110 is formed using a first resin. The dome section 120 is formed using a second resin. In this embodiment, the first resin forming the cylindrical section 110 is a thermoplastic resin and contains glass fiber. Like the first resin, the second resin forming the dome section 120 is a thermoplastic resin and contains an elastomer instead of glass fiber. Thus, the first resin has a lower linear expansion coefficient and lower yield strain than a resin not containing an elastomer. Further, the second resin has a higher linear expansion coefficient and higher yield strain than a resin not containing glass fiber. Specifically, the second resin has a higher linear expansion coefficient and higher yield strain than the first resin. Examples of the thermoplastic resin available for the first resin and the second resin include n-nylon such as 6-nylon and 12-nylon, n,m-nylon such as 6,6-nylon, and resin materials such as high density polystyrene (HDPE) and polypropylene. Examples of rubber available for the elastomer include ethylene-propylene-diene rubber (EPDM) and ethylene-propylene rubber (EPM). The first resin and the second resin contain the same specific resin material. Thus, the first resin and the second resin are allowed to have substantially the same properties in terms of gas barrier properties, except the linear expansion coefficient and yield strain.

The fiber-reinforced resin layer 200 is formed on an outer periphery of the liner 100 and is formed using a thermosetting resin containing carbon fiber, for example. An epoxy resin is available for the thermosetting resin, for example. The fiber-reinforced resin layer 200 is formed by bonding the thermosetting resin in a molten state to the carbon fiber, winding the carbon fiber with the bonded thermosetting resin around the liner 100, and then curing the thermosetting resin by heat.

In this embodiment, the size of the liner 100 is determined by a radius Lr and an axial length Ll. Assuming that the cylindrical section 110 has an axial length Ls and the dome section 120 has an axial length Ld, a relationship of Ll=Ls+2Ld is established. The inner surface of the fiber-reinforced resin layer 200 has an axial length Lc(=Ll). It is assumed that, in the state of the high temperature (85° C.), the outer surface of the dome section 120 of the liner 100 tightly contacts the inner surface of the fiber-reinforced resin layer 200. It is also assumed that stress in this state between the dome section 120 and the fiber-reinforced resin layer 200 is zero.

Figure 2:
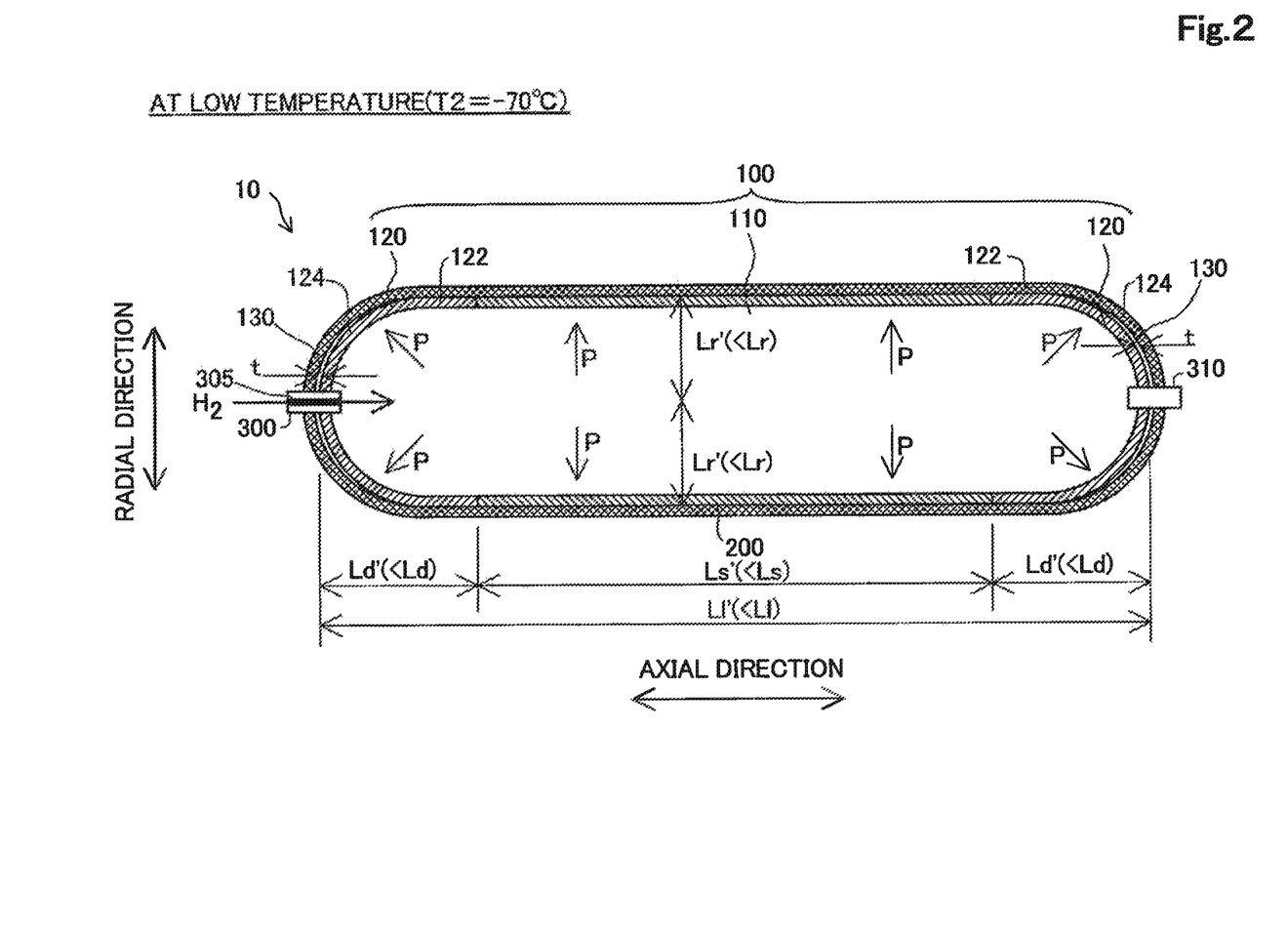
FIG. 2 is a sectional view showing the gas tank in a state of a low temperature T2.

FIG. 2 is a sectional view showing the gas tank 10 in a state of a low temperature T2 (T2=minus 70° C.). Gas is reduced in temperature when gas is expanded. If gas starts to be released continuously from the gas tank 10 fully filled with the gas to make the gas tank 10 empty of the gas, the gas tank 10 empty of the gas is placed at a temperature of about minus 70° C. This temperature corresponds to a temperature before filling with the gas is started. With the release of the gas from the gas tank 10, the gas expands adiabatically to reduce the temperature of the gas and that of the liner 100. These temperatures are reduced to lowest degrees if the gas starts to be released continuously from the gas tank 10 fully filled with the gas to make the gas tank 10 almost empty of the gas. In this case, the temperature of the liner 100 is reduced to about minus 70° C. If an automobile equipped with the gas tank 10 as a fuel tank is driven continuously on an expressway, for example, the temperature of the liner 100 is reduced to the lowest degree. The resin forming the liner 100 shrinks if reduced in temperature.

Signs Ll', Lr', Ls', and Ld' shown in FIG. 2 respectively indicate the axial length of the liner 100, the radius of the liner 100, the axial length of the cylindrical section 110, and the axial length of the dome section 120, each being at the low temperature T2. In this embodiment, the axial length L1 of the liner 100 is sufficiently greater than the diameter 2Lr and this makes the liner. 100 axially shrink largely. This generates an axially extending gap 130 of a size t between the substantially spherical part 124 of the dome section 120 of the liner 100 and the fiber-reinforced resin layer 200. The fiber-reinforced resin layer 200 also shrinks axially. Meanwhile, the fiber-reinforced resin layer 200 has a low linear expansion coefficient as a result of the inclusion of fiber, so it does not shrink as much as the liner 100. The liner 100 is not completely free from radial shrinkage. However, the diameter 2Lr is smaller than the axial length L1 of the liner 100, so the liner 100 does not largely shrink radially.

If gas is injected into the gas tank 10 in the presence of the gap 180 between the liner 100 and the fiber-reinforced resin layer 200, the liner 100 expands in response to the pressure of the gas toward the gap 130. Generally, if external force acts on resin to make the resin strain to a certain limit or more, the resin yields and becomes incapable of restoring its original state. This strain limit (also called "yield strain") generally becomes lower at a lower temperature.

Figure 3:
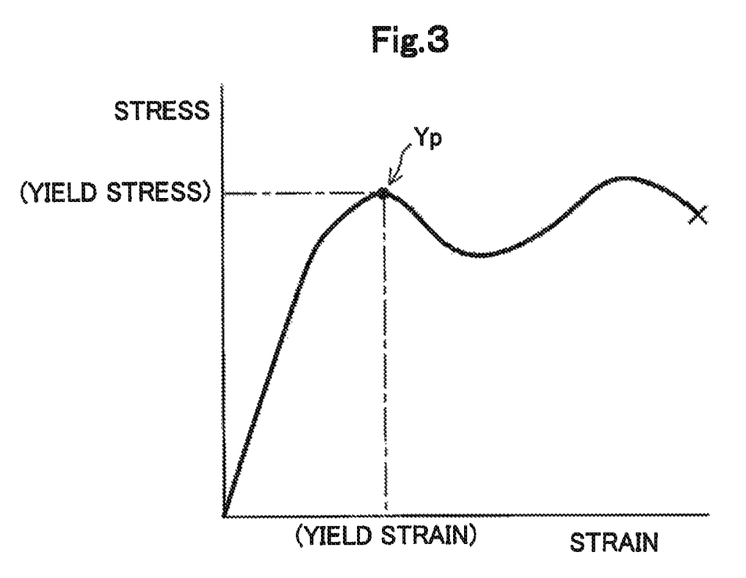
FIG. 3 is a graph showing an example of a resin stress-strain curve at a low temperature T2.

FIG. 3 is a graph showing an example of a resin stress-strain curve at a low temperature (T2=minus 70° C.). As shown in this example, many resins reach yield stress at an upper yield point Yp, and then stress is reduced once, causing breakdown of the resin. In this specification, strain occurring at the upper yield point Yp is called "yield strain."

Figure 4:
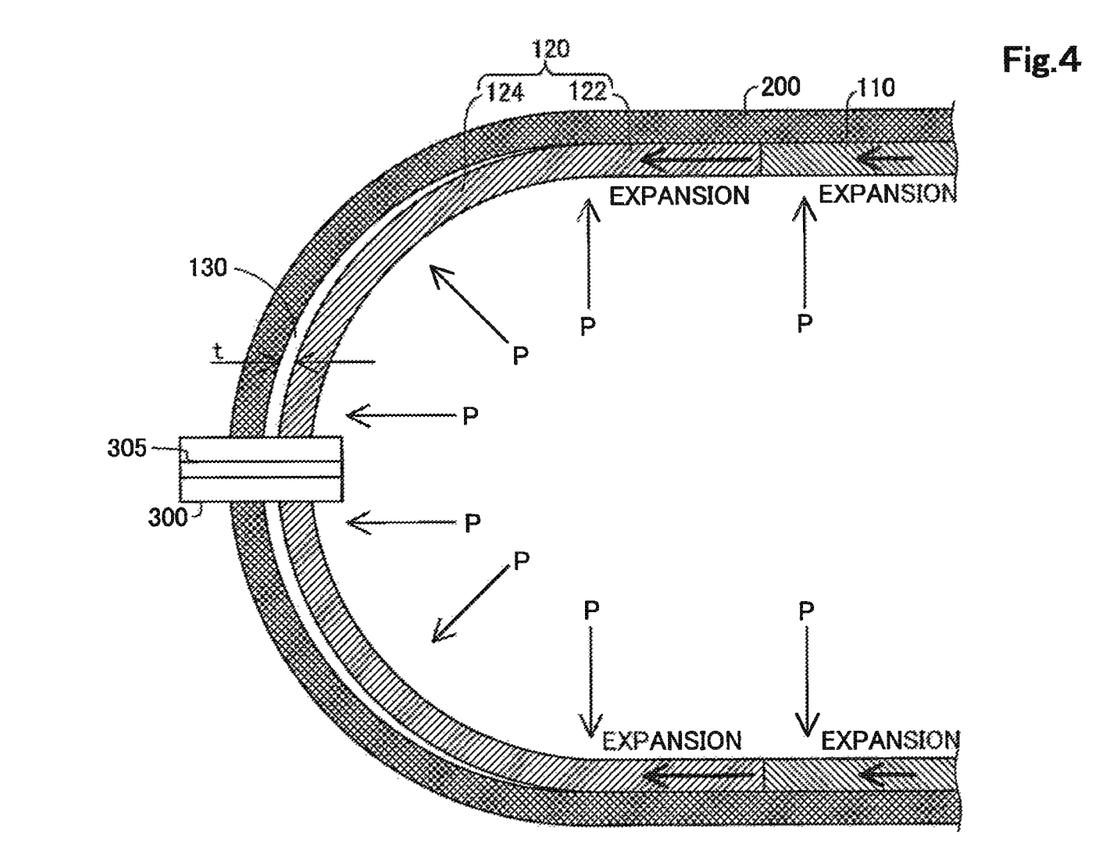
FIG. 4 is an explanatory view showing a state where the liner expands in response to pressure at the low temperature T2 in the first embodiment.

FIG. 4 is an explanatory view showing a state where the liner 100 expands in response to pressure at the low temperature T2 in the first embodiment. FIG. 4 shows the mouth member 300 and its vicinity. If the liner 100 is filled with gas, pressure P of the gas inside the liner 100 increases to push the liner 100 to expand. In this case, the liner 100 and the fiber-reinforced resin layer 200 substantially stick to each other in the radial direction of the liner 100. Thus, the liner 100 trying to expand receives resistive force from the fiber-reinforced resin layer 200. Thus, substantially no radial expansion occurs. In contrast, as a result of the presence of the gap 180, the liner 100 axially expands linearly in such a manner as to narrow the gap 130.

In the first embodiment, the second resin forming the dome section 120 contains an elastomer, so that a linear expansion coefficient is higher and yield strain is higher at the dome section 120 than at the cylindrical section 110. Thus, during expansion of the liner 100, the dome section 120 formed using a resin having a high linear expansion coefficient expands linearly. As a result, at the time of expansion of the liner 100, the liner 100 expands more easily at the dome section 120 to make it possible to suppress plastic deformation or damage to the liner 100 further than the case where the liner 100 is entirely formed using a resin not containing an elastomer.

Meanwhile, if the liner 100 is entirely formed using a resin containing an elastomer, the liner 100 shrinks more largely in response to temperature reduction of the liner 100 and increases the gap 180. In this case, if the liner 100 expands in response to the pressure of gas at a low temperature, the resin forming the liner 100 may be plastically deformed or damaged before the liner 100 contacts the fiber-reinforced resin layer 200 to receive resistive force from the fiber-reinforced resin layer 200. In the first embodiment, the cylindrical section 110 is formed using the first resin not containing an elastomer and has a low linear expansion coefficient. Thus, the cylindrical section 110 does not shrink largely in response to temperature reduction of the liner 100 to reduce the gap 130. As a result, if the liner 100 expands in response to the pressure of gas, the dome section 120 contacts the fiber-reinforced resin layer 200 to receive resistive force from the fiber-reinforced resin layer 200 before the resin forming the dome section 120 is plastically deformed or damaged. In this way, the liner 100 is unlikely to be plastically deformed or damaged.

Second Embodiment

Figure 5:
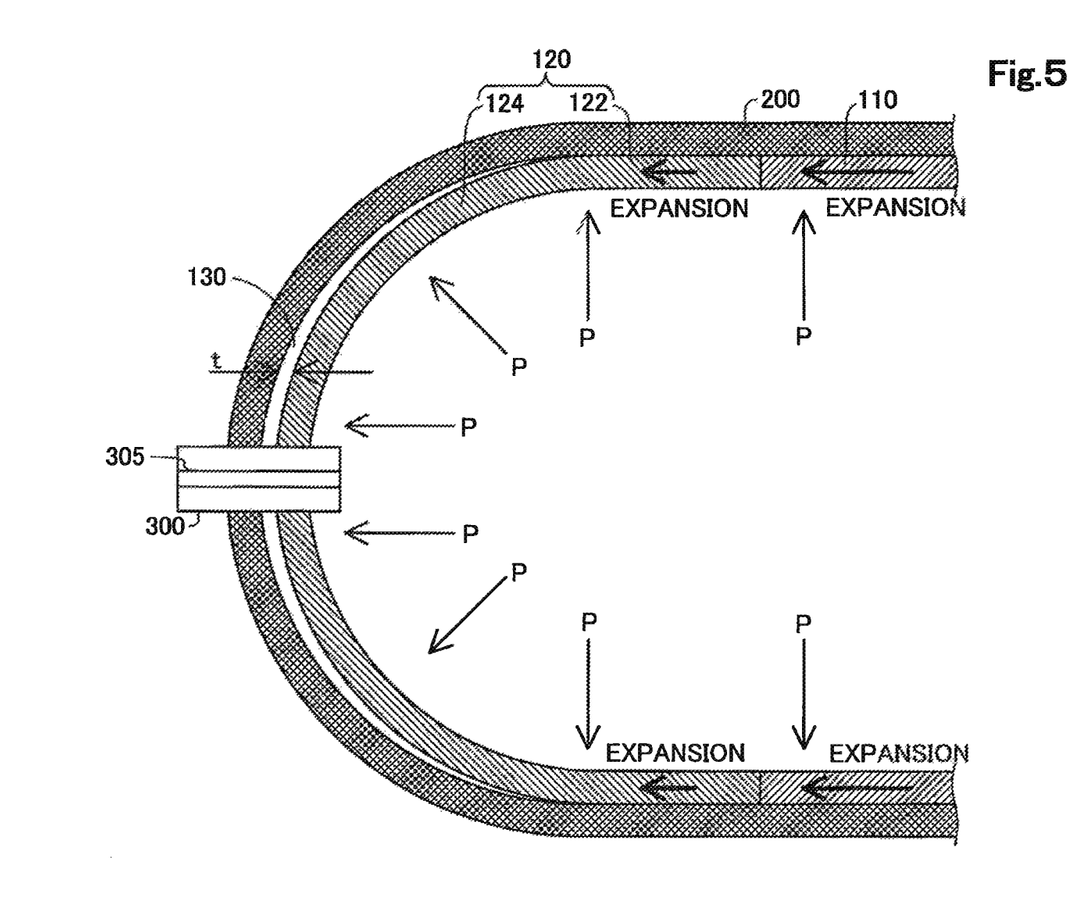
FIG. 5 is an explanatory view showing a state where the liner expands in response to pressure at the low temperature T2 in a second embodiment.

FIG. 5 is an explanatory view showing a state where the liner 100 expands in response to pressure at the low temperature T2 in a second embodiment. In the second embodiment, contrary to those of the first embodiment, the first resin forming the cylindrical section 110 is formed using a resin having a high linear expansion coefficient and high yield strain, whereas the second resin forming the dome section 120 is formed using a resin having a lower linear expansion coefficient and lower yield strain than the resin forming the cylindrical section 110.

In the second embodiment, if the liner 100 expands linearly in response to the pressure of gas inside the liner 100, the dome section 120 is not transformed largely and the cylindrical section 110 expands axially. The first resin forming the cylindrical section 110 has a high linear expansion coefficient and high yield strain, so that it is unlikely to be plastically deformed and damaged. As described above, the first resin forming the cylindrical section 110 may be formed using a resin having a higher linear expansion coefficient and higher yield strain than the second resin. The first embodiment and the second embodiment may be summarized as follows. One of either the first resin forming the cylindrical section 110 or the second resin forming the dome section 120 is required to have a higher linear expansion coefficient and higher yield strain than the other.

Third Embodiment

In the above-described embodiments, values relating to the linear expansion coefficient of a resin forming the liner 100 and the dimension of yield strain are not mentioned. A relationship between such values will be described in a third embodiment.

The value and the properties of each member shown in FIG. 1 are defined as follows:

Ls: Axial length of the cylindrical section 110 of the liner 100 at the high temperature T1

Ld: Axial length of the dome section 120 at the high temperature T1

Lc: Axial length of the fiber-reinforced resin layer 200 at the high temperature T1

$\alpha$s: Average linear expansion coefficient of the first resin forming the cylindrical section 110 in a period from the high temperature T1 to the low temperature T2

$\alpha$d: Average linear expansion coefficient of the second resin forming the dome section 120 in the period from the high temperature T1 to the low temperature T2

$\alpha$c: Average linear expansion coefficient of the fiber-reinforced resin layer 200 in the period from the high temperature T1 to the low temperature T2

$\varepsilon$s: Yield strain of the first resin at the low temperature T2

$\varepsilon$d: Yield strain of the second resin at the low temperature T2

The axial size t of the gap 130 in the state of the low temperature T2 shown in FIG. 2 is defined by the following formula:

[Formula 3]

$$2t = (\alpha_s L_s + 2\alpha_d L_d - \alpha_c L_c)\Delta T \quad (3)$$

In the formula (3), the first term of the right side ($\alpha_s L_s \times \Delta T$) resulting from removal of the brackets shows the degree of the axial shrinkage of the cylindrical section 110. Likewise, the second term of the right side ($2 \times \alpha_d L_d \times \Delta T$) shows the degrees of the axial shrinkages of the two dome sections 120. Likewise, the third term of the right side ($\alpha_c L_c \times \Delta T$) shows the degree of the axial shrinkage of the fiber-reinforced resin layer 200. The reason why the third term is given a minus sign is that the shrinkage of the fiber-reinforced resin layer 200 reduces the gap 180. For example, the temperature difference $\Delta T (= T1 - T2)$ is 155° C.

If the following formula is satisfied, plastic deformation or damage to the liner 100 may be prevented if the liner 100 is filled with gas to expand:

[Formula 4]

$$2t \leq 2\varepsilon_d L_d + \varepsilon_s L_s \quad (4)$$

The first term ($2\varepsilon_d L_d$) of the right side of the formula (4) shows strain occurring if the dome sections 120 expand in response to the internal pressure P. The second term ($\varepsilon_s L_s$) of the right side of the formula (4) shows strain occurring if the cylindrical section 110 expands in response to the internal pressure P.

A relationship expressed by the following formula is established between the axial length Ls of the cylindrical section 110 of the liner 100, the axial length Ld of the dome section 120 of the liner 100, and the axial length Lc of the fiber-reinforced resin layer 200, each being at the high temperature T1:

[Formula 5]

$$L_c = L_s + 2L_d \quad (5)$$

The following formula is obtained by solving the formulas (3), (4), and (5) given above in terms of Ls:

[Formula 6]

$$L_s \leq 2L_d \frac{\left(\frac{L_d}{\Delta T} - \alpha_d + \alpha_c\right)}{\left(\alpha_s - \alpha_c - \frac{L_s}{\Delta T}\right)} \quad (6)$$

As long as the length Ls of the cylindrical section 110 and the axial length Ld of the dome section 120 of the liner 100 are determined so as to satisfy the formula (6), the axial size t of the gap 180 between the dome section 120 of the liner 100 and the fiber-reinforced resin layer 200 does not exceed the yield strain of the liner 100, if the dome section 120 and the fiber-reinforced resin layer 200 tightly contact each other at the high temperature T1 and then the temperature of the gas tank 10 is reduced to the low temperature T2. This makes it possible to suppress plastic deformation or damage to the liner 100 more reliably. Additionally, if either one of the length Lc of the cylindrical section 110 or the axial length Ld of the dome section 120 of the liner 100 is known, the other can be figured out easily using the formula (6). The average linear expansion coefficients $\alpha d$, $\alpha s$, and $\alpha c$, and the yield strains $\varepsilon d$ and $\varepsilon s$ are obtained through experimentation.

First Different Embodiment

In the above-described embodiments, by the inclusion of an elastomer in a resin, the linear expansion coefficient and the yield strain of the resin are increased. Further, by the inclusion of glass fiber in a resin, the linear expansion coefficient and the yield strain of the resin are reduced. Alternatively, either one of the inclusions may be exclusively employed. In addition, instead of rubber, an ester such as polyester is available as an elastomer. The glass fiber may also be replaced by different fiber such as carbon fiber.

Second Different Embodiment

In the above-described embodiments, the fiber-reinforced resin layer 200 is a single layer. Alternatively, a fiber-reinforced resin layer may have two layers with an inner layer and an outer layer. In this case, the value of an average linear expansion coefficient at the inner layer is used as the value of the average linear expansion coefficient $\alpha c$ of the fiber-reinforced resin layer 200 of the third embodiment.

The present disclosure is not limited to the above-described embodiments or different embodiments but is feasible in the form of various other configurations within a range not deviating from the substance of the disclosure. For example, technical features in the embodiments or those in the different embodiments corresponding to those in each of the aspects described in SUMMARY can be replaced or combined, where appropriate, with the intention of solving some or all of the aforementioned problems or achieving some or all of the aforementioned effects. Unless they are described as absolute necessities in this specification, these technical features may be removed where appropriate.

The present disclosure has been made to solve the above-described problem and is feasible as the following aspects.

According to one aspect of the present disclosure, a gas tank liner is provided. The liner includes: a cylindrical section formed using a first resin; and a dome section formed using a second resin. The dome section is arranged at each axially opposite end of the cylindrical section. One of either the first resin or the second resin has a higher linear expansion coefficient and higher yield strain than the other. The yield strain is the threshold of strain that, when met, makes the first resin or the second resin incapable of restoring its original state if the first resin or the second resin strains and yields in response to the application of external force.

According to this aspect, one of either the first resin or the second resin has a higher linear expansion coefficient and higher yield strain than the other. Thus, during filling with gas, a section of the liner formed using the resin having a high linear expansion coefficient and high yield strain expands easily. This makes it possible to suppress plastic deformation or damage to the liner further than the case where the liner is entirely formed using the same resin.

The liner according to the above aspect, the second resin may have a higher linear expansion coefficient and higher yield strain than the first resin.

If the liner includes the cylindrical section and the dome section, a gap is likely to occur at a position adjacent to an axial end portion of the dome section. Thus, increasing the linear expansion coefficient of the dome section to provide the dome section with higher yield strain achieves more effective suppression of plastic deformation or damage to the liner.

The liner according to the above aspect, one of either the first resin or the second resin may contain a specific resin material that is not an elastomer and an elastomer, and the other one of either the first resin or the second resin is formed using the specific resin material and does not contain an elastomer.

According to this aspect, one of either the first resin or the second resin is allowed to be formed easily as a resin having a high linear expansion coefficient and high yield strain.

The liner according to the above aspect, the other resin may further contain fiber.

According to this aspect, the other one of either the first resin or the second resin is allowed to be formed easily as a resin having a low linear expansion coefficient and low yield strain.

According to one aspect of the present disclosure, a gas tank is provided. The gas tank comprises: the liner in accordance with any one of above aspects; and a fiber-reinforced resin layer formed on an outer periphery of the liner.

According to this aspect, one of either the first resin or the second resin has a high linear expansion coefficient and high yield strain. This causes a section of the liner formed using the resin having a high linear expansion coefficient and high yield strain to expand during filling with gas. This makes it possible to suppress plastic deformation or damage to the liner further than the case where the liner is entirely formed using the same resin.

The gas tank according to the above aspect, the following formula is satisfied:

[Formula 7]

$$L_s \leq 2L_d \frac{\left(\frac{L_d}{\Delta T} - \alpha_d + \alpha_c\right)}{\left(\alpha_s - \alpha_c - \frac{L_s}{\Delta T}\right)} \quad (7)$$

where $\Delta T$ is a temperature difference between a high temperature T1 at a time after completion of filling with gas and a low temperature T2 at a time before commencement of filling with the gas, Ls is an axial length of the cylindrical section and Ld is an axial length of the dome section, each being at the high temperature T1, $\alpha s$ is an average linear expansion coefficient of the first resin, $\alpha d$ is an average linear expansion coefficient of the second resin, and $\alpha c$ is an average linear expansion coefficient of the fiber-reinforced resin layer, each being in a period from the high temperature T1 to the low temperature T2, and $\varepsilon s$ is yield strain of the first resin and $\varepsilon d$ is yield strain of the second resin, each being at the low temperature T2.

According to this aspect, if the dome section of the liner and a fiber-reinforced resin layer tightly contact each other at the high temperature T1 and then the temperature of the gas tank is reduced to the low temperature T2, the gap between the dome section and the fiber-reinforced resin layer does not exceed the yield strain of the liner. This makes it possible to suppress plastic deformation or damage to the liner more reliably.

According to one aspect of the present disclosure, a gas tank is provided. The gas tank comprises:

a liner; and
a fiber-reinforced resin layer formed on an outer periphery of the liner, wherein
the liner comprises:
a cylindrical section formed using a first resin; and
a dome section formed using a second resin, the dome section being arranged at each axially opposite end of the cylindrical section, and
the following formula is satisfied

[Formula 8]

$$L_s \leq 2L_d \frac{\left(\frac{L_d}{\Delta T} - \alpha_d + \alpha_c\right)}{\left(\alpha_s - \alpha_c - \frac{L_s}{\Delta T}\right)} \quad (8)$$

where $\Delta T$ is a temperature difference between a high temperature T1 at a time after completion of filling with gas and a low temperature T2 at a time before commencement of filling with the gas, Ls is an axial length of the cylindrical section and Ld is an axial length of the dome section, each being at the high temperature T1, $\alpha s$ is an average linear expansion coefficient of the first resin, $\alpha d$ is an average linear expansion coefficient of the second resin, and $\alpha c$ is an average linear expansion coefficient of the fiber-reinforced resin layer, each being in a period from the high temperature T1 to the low temperature T2, and $\varepsilon s$ is yield strain of the first resin and $\varepsilon d$ is yield strain of the second resin, each being at the low temperature T2, the yield strain being the threshold of strain that, when met, makes the first resin or the second resin incapable of restoring its original state if the first resin or the second resin strains and yields in response to the application of external force.

According to this aspect, if the dome section of the liner and a fiber-reinforced resin layer tightly contact each other at the high temperature T1 and then the temperature of the gas tank is reduced to the low temperature T2, the gap between the dome section and the fiber-reinforced resin layer does not exceed the yield strain of the liner. This makes it possible to suppress plastic deformation or damage to the liner more reliably.

The gas tank according to the above aspect, the high temperature T1 may be about plus 85° C. and the low temperature T2 may be about minus 70° C.

If gas starts to be injected into an empty gas tank to fully fill the gas tank with the injected gas, the temperature of the gas tank is increased to about plus 85° C. If the gas starts to be released continuously from a completely full gas tank to make the gas tank empty, the temperature of the gas tank is reduced to about minus 70° C. Thus, the high temperature T1 is suitably set at plus 85° C., whereas the low temperature T2 is suitably set at minus 70° C.

The present disclosure is feasible in various aspects. For example, the present disclosure is feasible in various aspects including a gas tank as well as a gas tank liner.

What is claimed is:

1. A gas tank liner comprising:
a cylindrical section; and
a dome section arranged at each axially opposite end of the cylindrical section, wherein
one of either the cylindrical section or the dome section is
formed using a first resin that contains an elastomer and a specific resin material that is not an elastomer, and an other one of the cylindrical section or the dome section is formed using a second resin that contains the specific resin material and does not contain an elastomer, and the first resin has a higher linear expansion coefficient and higher yield strength than the second resin.

2. The liner in accordance with claim 1, wherein the dome section is formed using the first resin, and the cylindrical section is formed using the second resin.

3. The liner in accordance with claim 2, wherein the second resin further contains fiber.

4. A gas tank comprising:

the gas tank liner of claim 3; and a fiber-reinforced resin layer formed on an outer periphery of the liner, wherein the cylindrical section of the gas tank liner is formed using the first resin;

the dome section of the gas tank liner is formed using the second resin, and the following formula is satisfied:

[Formula 2]

$$L_s \leq 2L_d \frac{\left(\frac{L_d}{\Delta T} - \alpha_d + \alpha_c\right)}{\left(\alpha_s - \alpha_c - \frac{L_s}{\Delta T}\right)} \quad (2)$$

where $\Delta T$ is a temperature difference between a high temperature $T_1$ at a time after completion of filling with gas and a low temperature $T_2$ at a time before commencement of filling with the gas, $L_s$ is an axial length of the cylindrical section and $L_d$ is an axial length of the dome section, each being at the high temperature $T_1$, $\alpha_s$ is an average linear expansion coefficient of the first resin, $\alpha_d$ is an average linear expansion coefficient of the second resin, and $\alpha_c$ is an average linear expansion coefficient of the fiber-reinforced resin layer, each being in a period from the high temperature $T_1$ to the low temperature $T_2$, and $\varepsilon_s$ is yield strength of the first resin and $\varepsilon_d$ is yield strength of the second resin, each being at the low temperature $T_2$, the yield strength being the threshold of strength that, when met, makes the first resin or the second resin incapable of restoring its original state if the first resin or the second resin strengths and yields in response to the application of external force.

5. The gas tank in accordance with claim 4, wherein the high temperature $T_1$ is about plus 85° C. and the low temperature $T_2$ is about minus 70° C.

6. The liner in accordance with claim 1, wherein the second resin further contains fiber.

7. A gas tank comprising:

the gas tank liner of claim 6; and a fiber-reinforced resin layer formed on an outer periphery of the liner, wherein the cylindrical section of the gas tank liner is formed using the first resin; and the dome section of the gas tank liner is formed using the second resin, and the following formula is satisfied:

[Formula 2]

$$L_s \leq 2L_d \frac{\left(\frac{L_d}{\Delta T} - \alpha_d + \alpha_c\right)}{\left(\alpha_s - \alpha_c - \frac{L_s}{\Delta T}\right)} \quad (2)$$

where $\Delta T$ is a temperature difference between a high temperature $T_1$ at a time after completion of filling with gas and a low temperature $T_2$ at a time before commencement of filling with the gas, $L_s$ is an axial length of the cylindrical section and $L_d$ is an axial length of the dome section, each being at the high temperature $T_1$, $\alpha_s$ is an average linear expansion coefficient of the first resin, $\alpha_d$ is an average linear expansion coefficient of the second resin, and $\alpha_c$ is an average linear expansion coefficient of the fiber-reinforced resin layer, each being in a period from the high temperature $T_1$ to the low temperature $T_2$, and $\varepsilon_s$ is yield strength of the first resin and $\varepsilon_d$ is yield strength of the second resin, each being at the low temperature $T_2$, the yield strength being the threshold of strength that, when met, makes the first resin or the second resin incapable of restoring its original state if the first resin or the second resin strengths and yields in response to the application of external force.

8. The gas tank in accordance with claim 7, wherein the high temperature $T_1$ is about plus 85° C. and the low temperature $T_2$ is about minus 70° C.

9. A gas tank comprising:

a liner; and a fiber-reinforced resin layer formed on an outer periphery of the liner, wherein the liner comprises:

a cylindrical section; and a dome section arranged at each axially opposite end of the cylindrical section, wherein one of either the cylindrical section or the dome section is formed using a first resin that contains an elastomer and a specific resin material that is not an elastomer, and an other one of the cylindrical section or the dome section is formed using a second resin that contains the specific resin material and does not contain an elastomer, and the first resin has a higher linear expansion coefficient and higher yield strength than the second resin.

10. The gas tank in accordance with claim 9, wherein the dome section is formed using the first resin, and the cylindrical section is formed using the second resin.

11. The gas tank in accordance with claim 10, wherein the second resin further contains fiber.

12. The gas tank in accordance with claim 11, wherein the following formula is satisfied:

[Formula 1]

$$L_s \leq 2L_d \frac{\left(\frac{L_d}{\Delta T} - \alpha_d + \alpha_c\right)}{\left(\alpha_s - \alpha_c - \frac{L_s}{\Delta T}\right)} \quad (1)$$

where ΔT is a temperature difference between a high temperature T1 at a time after completion of filling with gas and a low temperature T2 at a time before commencement of filling with the gas, Ls is an axial length of the cylindrical section and Ld is an axial length of the dome section, each being at the high temperature T1, $\alpha s$ is an average linear expansion coefficient of the first resin, $\alpha d$ is an average linear expansion coefficient of the second resin, and $\alpha c$ is an average linear expansion coefficient of the fiber-reinforced resin layer, each being in a period from the high temperature T1 to the low temperature T2, and $\varepsilon s$ is yield strength of the first resin and $\varepsilon d$ is yield strength of the second resin, each being at the low temperature T2.

13. The gas tank in accordance with claim 12, wherein the high temperature T1 is about plus 85° C. and the low temperature T2 is about minus 70° C.

14. The gas tank in accordance with claim 9, wherein the second resin further contains fiber.

15. The gas tank in accordance with claim 14, wherein the following formula is satisfied:

[Formula 1]

$$L_s \leq 2L_d \frac{\left(\frac{L_d}{\Delta T} - \alpha_d + \alpha_c\right)}{\left(\alpha_s - \alpha_c - \frac{L_s}{\Delta T}\right)} \quad (1)$$

where ΔT is a temperature difference between a high temperature T1 at a time after completion of filling with gas and a low temperature T2 at a time before commencement of filling with the gas, Ls is an axial length of the cylindrical section and Ld is an axial length of the dome section, each being at the high temperature T1, $\alpha s$ is an average linear expansion coefficient of the first resin, $\alpha d$ is an average linear expansion coefficient of the second resin, and $\alpha c$ is an average linear expansion coefficient of the fiber-reinforced resin layer, each being in a period from the high temperature T1 to the low temperature T2, and $\varepsilon s$ is yield strength of the first resin and $\varepsilon d$ is yield strength of the second resin, each being at the low temperature T2.

16. The gas tank in accordance with claim 15, wherein the high temperature T1 is about plus 85° C. and the low temperature T2 is about minus 70° C.

* * * * *